(12) United States Patent
Kuo

(10) Patent No.: US 7,870,732 B2
(45) Date of Patent: Jan. 18, 2011

(54) SUBMARINE COLD WATER PIPE WATER INTAKE SYSTEM OF AN OCEAN THERMAL ENERGY CONVERSION POWER PLANT

(76) Inventor: Fang Sheng Kuo, No.59-17, Hengkeng Lane, Beitun District, Taichung City 406 (TW)

( * ) Notice: Subject to any disclaimer, the term of this patent is extended or adjusted under 35 U.S.C. 154(b) by 0 days.

(21) Appl. No.: 12/078,538

(22) Filed: Apr. 1, 2008

(65) Prior Publication Data

US 2010/0275597 A1 Nov. 4, 2010

(51) Int. Cl.
*F03G 7/04* (2006.01)
(52) U.S. Cl. ...................... 60/641.6; 60/641.7
(58) Field of Classification Search ............... 60/641.6, 60/641.7
See application file for complete search history.

(56) References Cited

U.S. PATENT DOCUMENTS 3,934,289 A * 1/1976 Shaw .............................. 441/5
4,116,009 A * 9/1978 Daubin ........................ 114/264
4,273,068 A * 6/1981 McNary ...................... 114/264
4,293,239 A * 10/1981 Petty et al. ................... 405/203
4,358,225 A * 11/1982 van der Pot et al. ......... 405/303
4,497,342 A   2/1985 Wenzel et al. ............... 137/565

OTHER PUBLICATIONS

"Ocean Thermal Energy," www.hawaii.gov/dbedt/info/energy/renewable/otec.
"Ocean Thermal Energy Conversion," www.sea02.com/otec/.

* cited by examiner

*Primary Examiner*—Hoang M Nguyen
(74) *Attorney, Agent, or Firm*—Wang Law Firm; Li K. Wang

(57) ABSTRACT

A submarine cold water pipe water intake system of an ocean thermal energy conversion power plant is installed at a cold water inlet of a power boat, and the cold water pipe includes: a water intake head; a water intake pipe formed by connecting composite pipes in a series, and each composite pipe is formed by arranging a plurality of wavy inner pipes sequentially into a tubular shape; a connecting pipe formed by engaging an outer pipe and an inner pipe, and an inner pipe of the connecting pipe being connected to the cold water inlet of the power boat, and an end of the outer pipe of the connecting pipe is connected to a connecting portion of the water intake pipe.

11 Claims, 16 Drawing Sheets

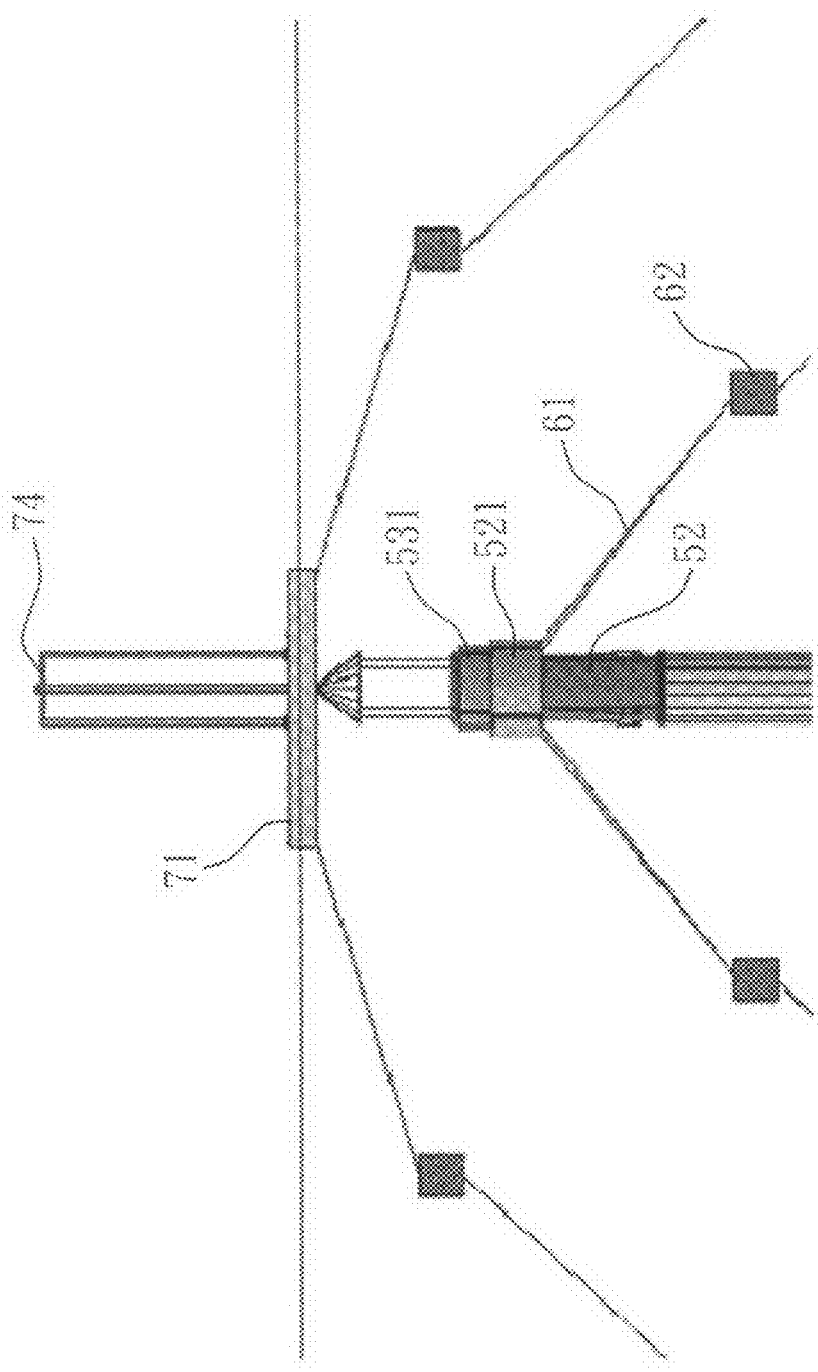

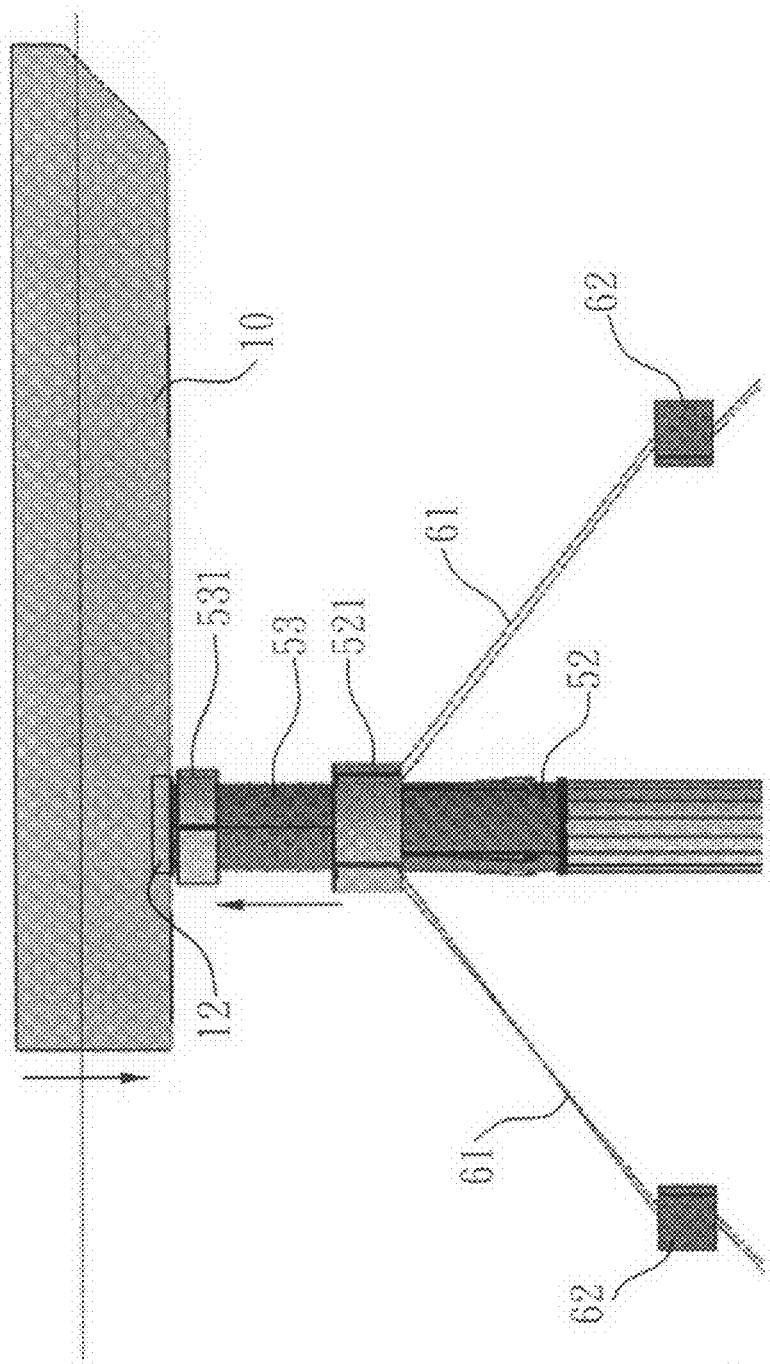

SUBMARINE COLD WATER PIPE WATER INTAKE SYSTEM OF AN OCEAN THERMAL ENERGY CONVERSION POWER PLANT

BACKGROUND OF THE INVENTION

1. Field of the Invention

The present invention relates to an ocean thermal energy conversion, and more particularly to a submarine cold water pipe water intake system of an ocean thermal energy conversion power plant.

2. Description of the Related Art

In the principle of ocean thermal energy conversion, seawater absorbs solar energy to increase the temperature of the surface seawater, and the temperature of deep seawater is lower than the temperature of the surface seawater, and the temperature difference between the surface seawater and the deep seawater is used for generating electricity. An electric power generation method can be divided into open and closed power generations, and the open power generation system is limited to a low efficiency of the present low-pressure turbine, and thus the open power generation system cannot be commercialized. In the principle of the closed electric generation as shown in FIG. 20, a working medium (ammonia) is filled into a closed pipeline, such that when the hot seawater evaporates the liquid ammonia into ammonia vapor by a heat exchange in the evaporation tank, the ammonia vapor is condensed into liquid ammonia by the heat exchange in the condensation tank. Now, the evaporation tank and the condensation tank contain ammonia vapor currents with a pressure difference which is used for driving the turbine of an electric generator to start the electric generation.

Since the temperature difference of seawater is around 20° C. only, it needs a large quantity of seawater to achieve the electric power up to the commercial level, and manufactures a water intake pipe with a large diameter to suck cold and hot seawater. If the water intake pipe with a large diameter is made of steel, the manufacture is not easy, and the manufacturing cost is very high. Particularly for the water intake pipes for sucking deep seawater from the seabed, the pipes require a large diameter and a large length to intake the deep seawater, and thus it is a subject of the present invention to manufacture a water intake pipe with a large diameter and a strong structural strength to bear with the deep sea currents.

SUMMARY OF THE INVENTION

It is a primary objective of the present invention to provide a submarine cold water pipe water intake system of an ocean thermal energy conversion power plant, wherein a large quantity of low-temperature deep seawater is sucked from the seabed for the operation of a commercial electric power plant.

Another objective of the present invention is to provide a submarine cold water pipe water intake system of an ocean thermal energy conversion power plant, wherein the system has a powerful structural strength for bearing with the deep sea currents and preventing damages.

To achieve the foregoing objectives, the present invention provides a submarine cold water pipe water intake system of an ocean thermal energy conversion power plant, wherein a power boat includes a cold water inlet, with an end connected to the cold water inlet of the power boat, and another end extended into a seabed for sucking low-temperature seawater, and the cold water pipe comprises:

a water intake head, having a plurality of filter holes disposed on a surface of the water intake head, and a fixing portion disposed at an end of the water intake head an end;

a water intake pipe, having an end connected to the water intake head, and formed by connecting a plurality of composite pipes in series, wherein each composite pipe comprises a plurality of wavy inner pipes arranged sequentially into a tubular shape, and a watertight layer wrapped around internal and external peripheries of a pipe wall of the composite pipe, and each of both ends of the composite pipe has a connecting portion, and the connecting portion has a plurality of connecting through holes respectively corresponding to each wavy inner pipe; and a connecting pipe, formed by engaging an outer pipe with an inner pipe, and the inner pipe being connected to a water inlet of the power boat, and an end of the outer pipe of the connecting pipe having an engaging portion connected to a connecting portion of the water intake pipe, and each of the outer pipe and the inner pipe has one or more buoys.

BRIEF DESCRIPTION OF THE DRAWINGS

FIGS. 6 to 19 show a procedure of installing a submarine cold water pipe water intake system of an ocean thermal energy conversion power plant in accordance with the present invention.

DETAILED DESCRIPTION OF THE PREFERRED EMBODIMENTS

Figure 1:
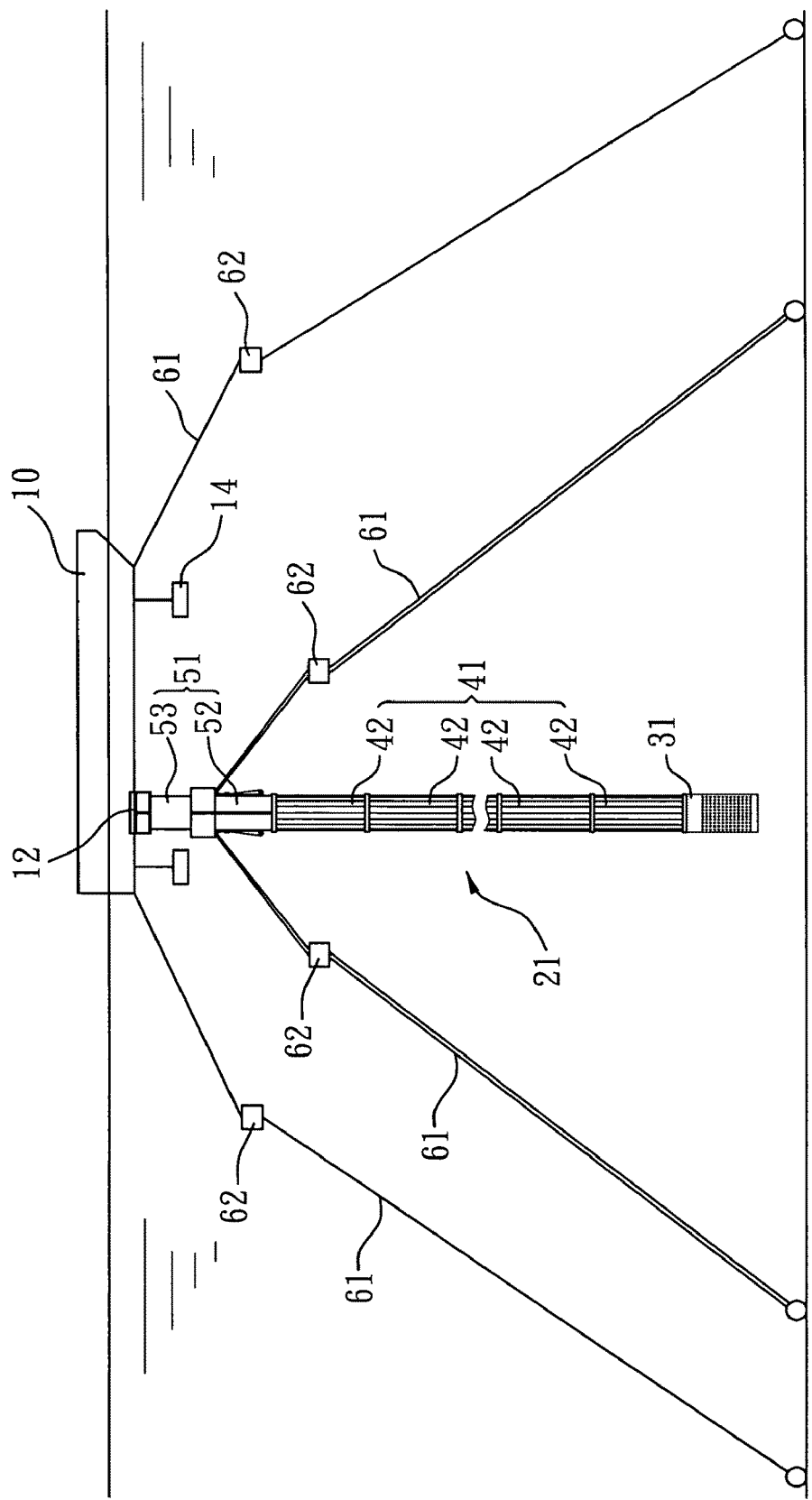
FIG. 1 is a schematic view of a structure of the present invention.

Referring to FIG. 1 for a submarine cold water pipe water intake system of an ocean thermal energy conversion power plant in accordance with the present invention, a power boat 10 has a cold water inlet 12, a water pump device (not shown in the figure) disposed at the cold water inlet 12, a cold water pipe 21 having an end connected to the cold water inlet 12 of the power boat 10, and another end extended into a seabed for sucking low-temperature seawater, and the cold water pipe 21 comprises a water intake head 31, a water intake pipe 41 and a connecting pipe 51 as described below.

Figure 2:
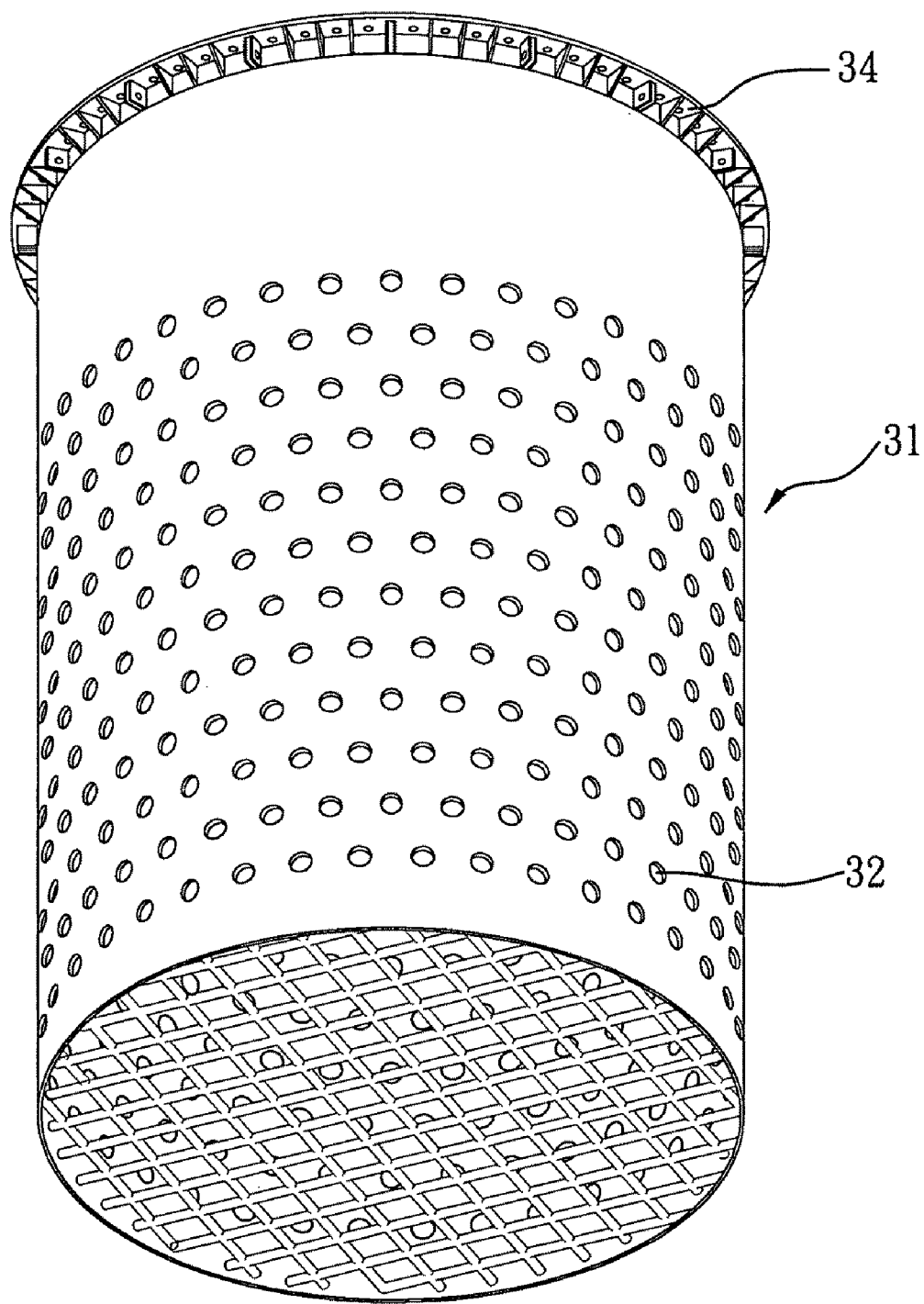
FIG. 2 is a perspective view of a water intake head of the present invention.

The water intake head 31 as shown in FIG. 2 includes a plurality of filter holes 32 disposed on the surface of the water intake head 31 for preventing foreign substances in the seawater from being sucked into the water intake head 31, and the top of the water intake head 31 is extended outward to form a fixing portion 34.

Figure 3:
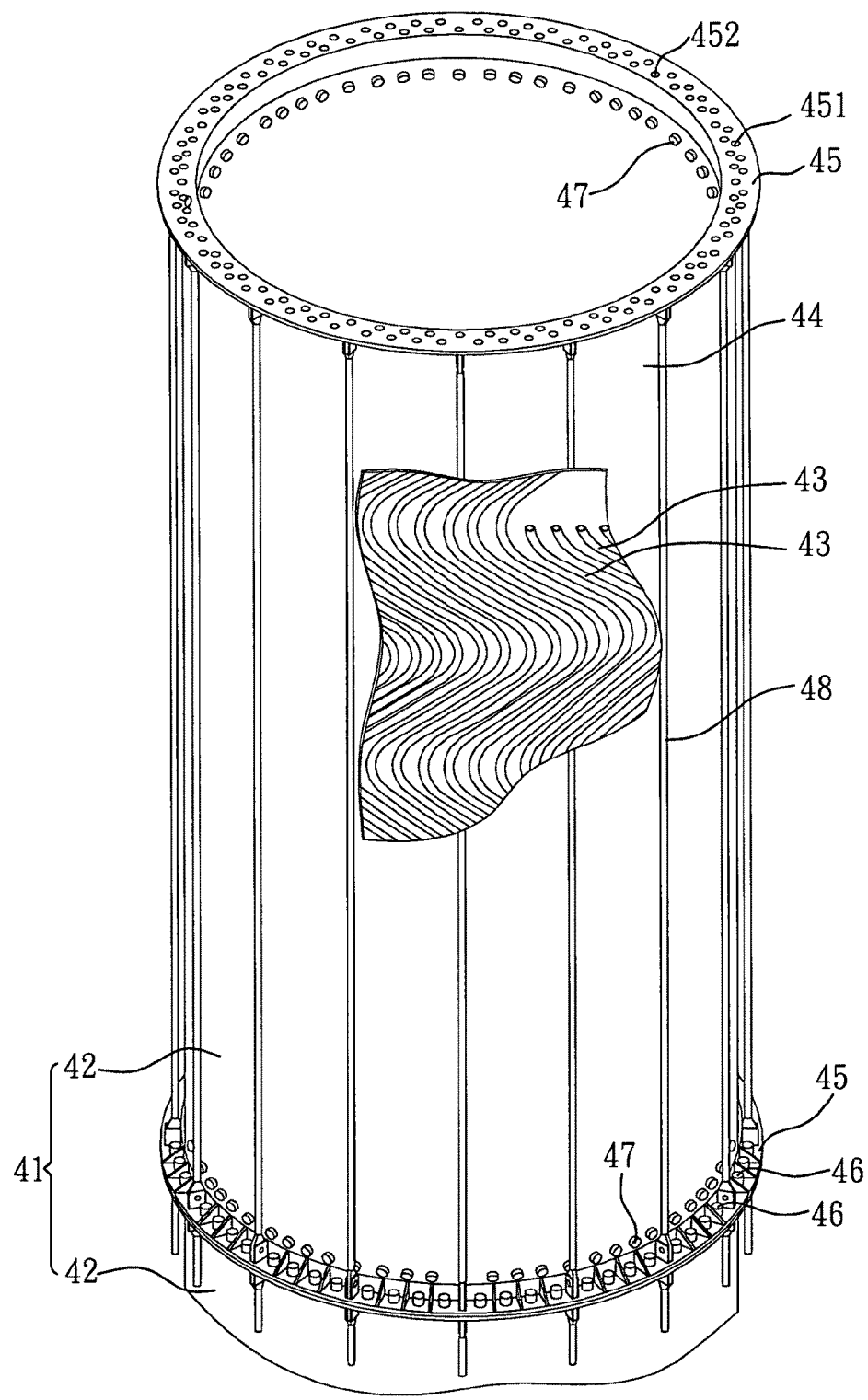
FIG. 3 is a perspective view of a water intake pipe of the present invention.
Figure 3A:
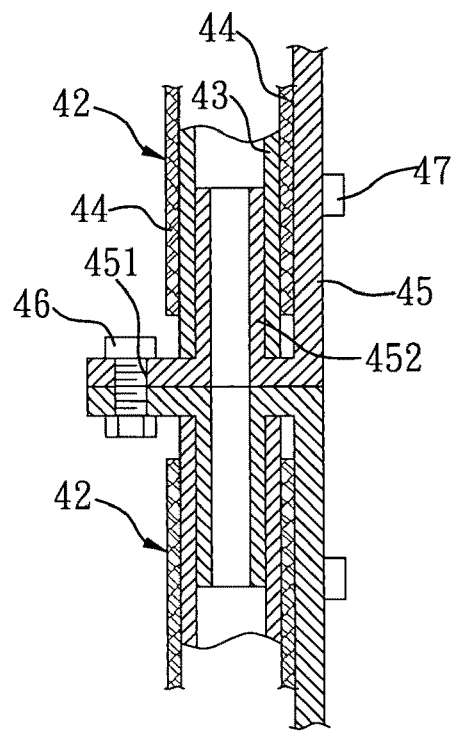
FIG. 3A is a lateral sectional view of connecting composite pipes of a water intake pipe in accordance with the present invention.
Figure 3B:
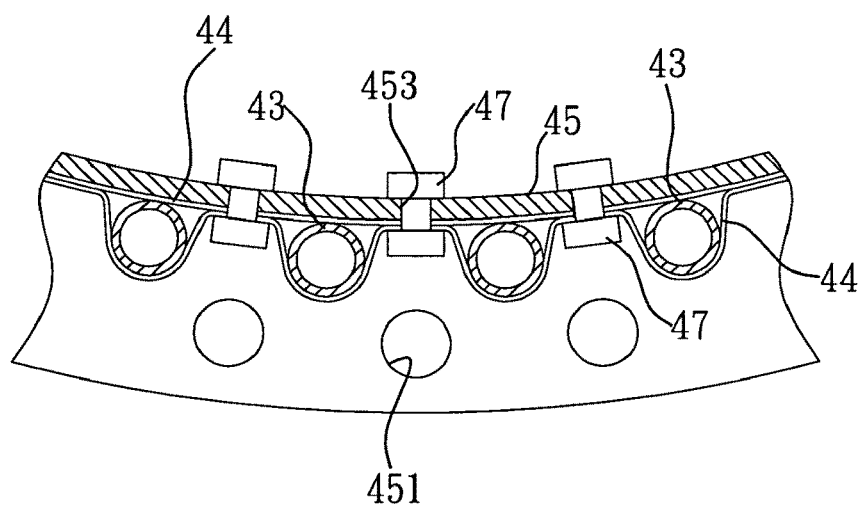
FIG. 3B is a top sectional view of a connecting portion of a water intake pipe in accordance with the present invention.

The water intake pipe 41 as shown in FIG. 3 includes a plurality of composite pipes 42 connected in series with each other, wherein each composite pipe 42 is formed by a plurality of flexible and bendable wavy inner pipes 43 arranged sequentially into a tubular shape, and a powerful watertight fabric 44 is wrapped around internal and external peripheries of the composite pipe 42, and each of both ends of the composite pipe 42 has a circular connecting portion 45 made of steel for maintaining the circularity of the opening of the composite pipe 42. Referring to FIG. 3A, the connecting portion 45 has a L-shaped cross-section, a plurality of fixing holes 451 disposed on a distal surface of the connecting portion 45, and a plurality of outwardly extended connecting through holes 452, wherein each composite pipe 42 is connected to a fixing hole 451 of the connecting portion 45, and passed into the fixing hole 451 of each connecting portion 45 by a plurality of locking elements 46 respectively to integrate each composite pipe 42, and the connecting portion 45 at an end of the water intake pipe 41 formed by connecting each composite pipe 42 in series is connected to the fixing portion 34 of the water intake head 31, and the plurality of connecting through holes 452 extended outwardly from a distal surface of the connecting portion 45 are provided for connecting each wavy inner pipe 43 in the composite pipe 42 in series, such that each wavy inner pipe 43 in the composite pipe 42 is passed through each connecting through hole 452 and interconnected to the outside. In FIG. 3B, a plurality of positioning holes 453 are disposed around a wall of the connecting portion 45, and the composite pipe 42 is wrapped by a watertight fabric 44 and secured to the wall of the composite pipe 42 and into each positioning hole 453 of the connecting portion 45 by a positioning element 47, so that the composite pipe 42 is connected to the connecting portion 45, and a plurality of steel ropes wrapped with polyethylene resin 48 are installed between the connecting portions 45 on both upper and lower ends of the composite pipe 42 for supporting the upper and lower ends of the composite pipe 42 to assure the length of the composite pipe 42. When the composite pipe 42 is in use, water with an appropriate water pressure is filled into the wavy inner pipe 43 in the composite pipe 42 of a surge tank (not shown in the figure) to expand the pipe wall of the composite pipe 42 and reinforce the flattening strength of seawater in the composite pipe 42 to change the water level in the surge tank, so as to cope with different environmental requirements by adjusting the pressure of the wavy inner pipe 43 in the composite pipe 42.

Figure 4:
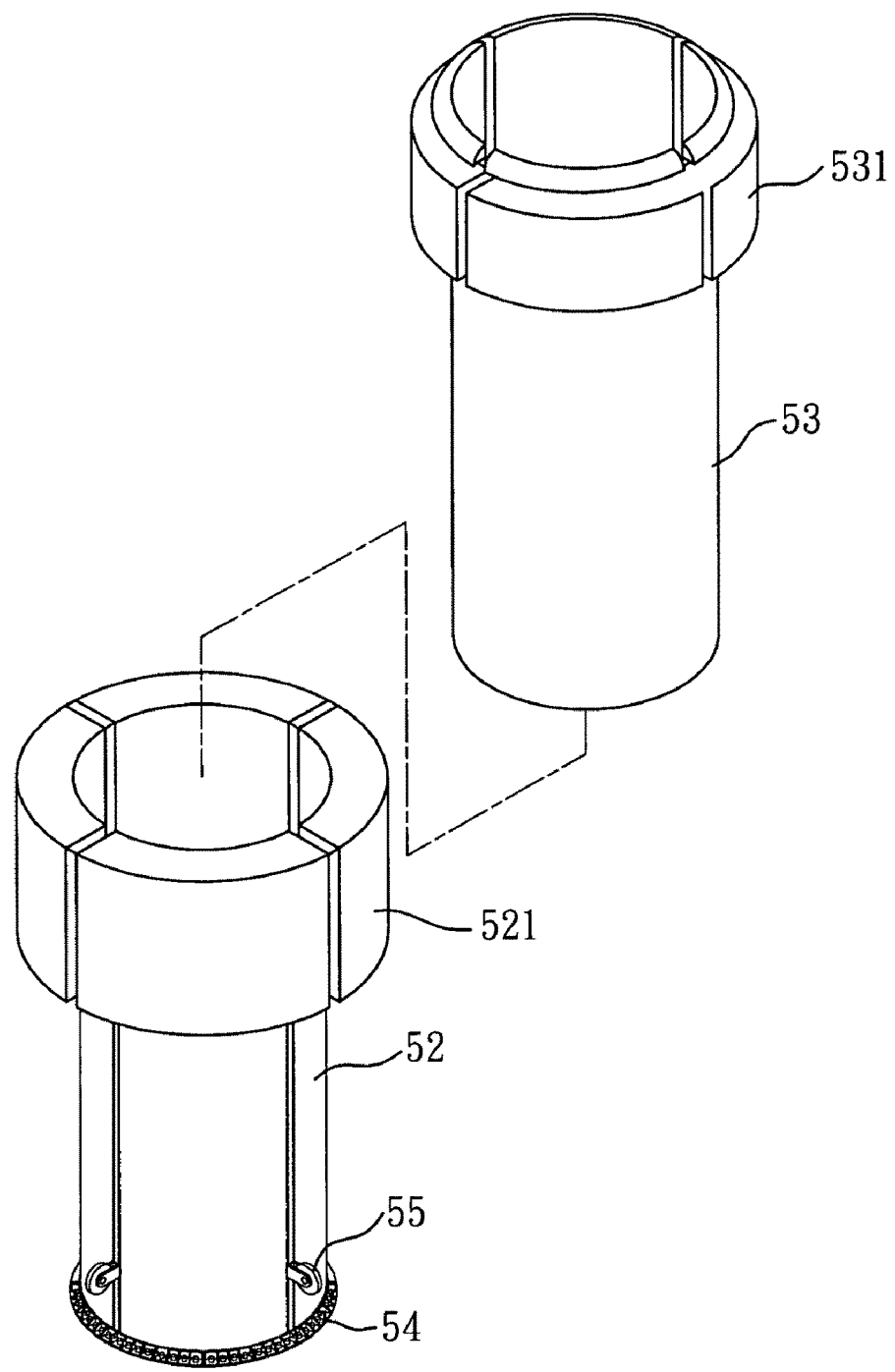
FIG. 4 is a perspective view of a connecting pipe of the present invention.

The connecting pipe 51 as shown in FIG. 4 is formed by sheathing an outer pipe 52 with an inner pipe 53, and the inner pipe 53 of the connecting pipe 51 is connected to the cold water inlet 12 of the power boat 10, and an end of the outer pipe 52 of the connecting pipe 51 has an engaging portion 54 connected with the connecting portion 45 of the water intake pipe 41, and a plurality of buoys 521, 531 are disposed around external peripheries of the outer pipe 52 and the inner pipe 53, and the buoyancy provided by the buoy 521 of the outer pipe 52 is greater than the total weight of the water intake head 31, the water intake pipe 41 and the outer pipe 52. The buoyancy of the buoy 531 of the inner pipe 53 can be adjusted to extend or retract the inner pipe 53 in the outer pipe 52, so that when winds and waves of the sea are severe, water can be added into the buoy 531 of the inner pipe 53 to reduce the buoyancy of the inner pipe 53 and sink the inner pipe 53 below sea level in order to effectively minimize or avoid the adverse effect of the winds and waves to the connecting pipe 51. After the inner pipe 53 is connected to the cold water inlet 12 of the power boat 10, the draught of the power boat 10 can be increased at the sea surface, since the inner pipe 53 can be extended or retracted in the outer pipe 52. Therefore, the power boat 10 can carry out the electric power generation at sea surface more stably.

Figure 5:
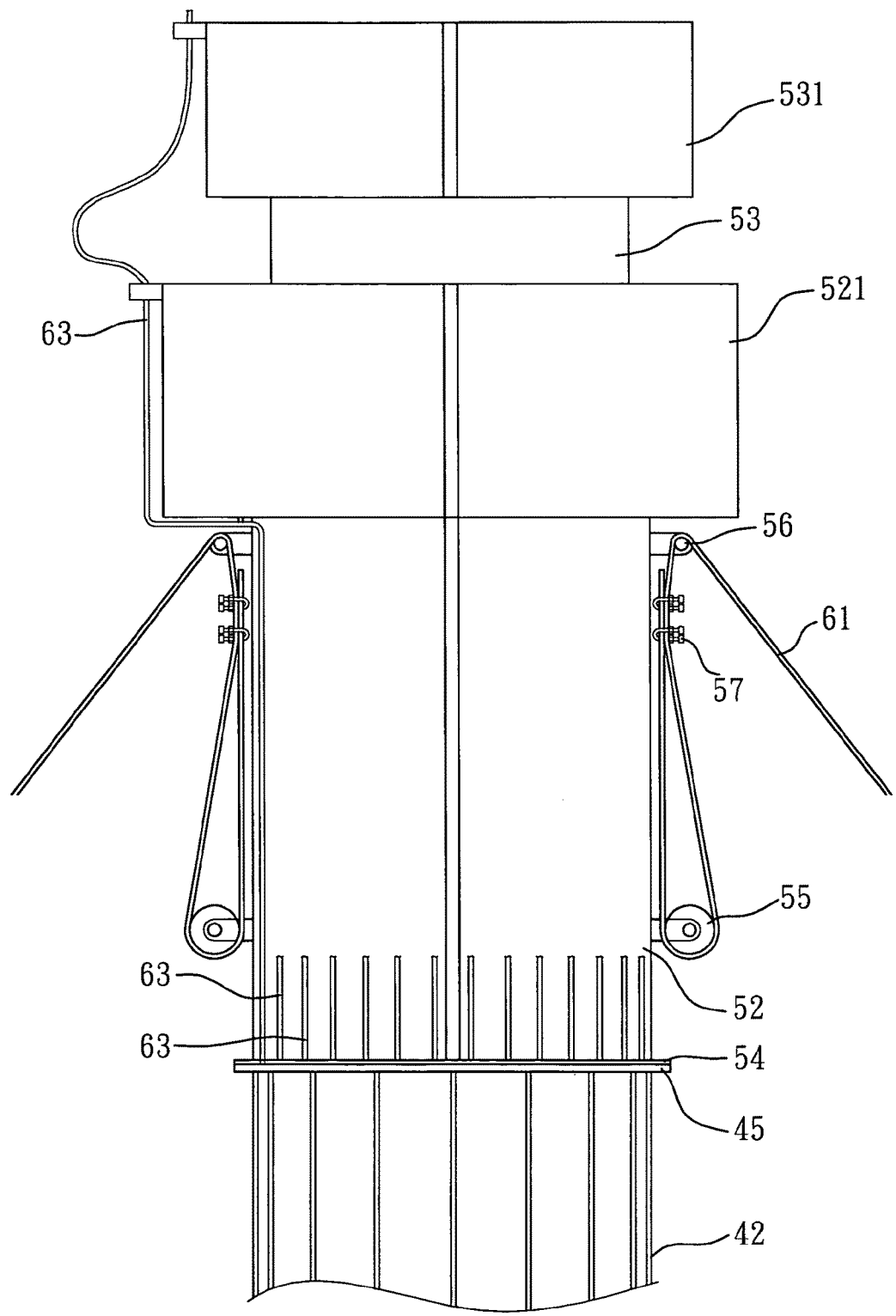
FIG. 5 is a schematic view of an outer pipe having a stationary steel cable wound around an external periphery of the outer pipe in accordance with the present invention.

However, it is noteworthy to point out that the external periphery of the outer pipe 52 has a plurality of fixed pulleys 55, 56 as shown in FIG. 5, and an end of a stationary steel cable 61 is wound around fixed pulleys 55, 56 of the outer pipe 52, and fixed by a steel cable fixing clamp 57, and another end of the stationary steel cable 61 is extended outward and sunk into a seabed, and each stationary steel cable 61 has a floating box 62 for pulling and supporting the stationary steel cable 61 by the buoyancy of the floating box 62 to produce a horizontal force in order to maintain the stability of the cold water pipe 21 in the sea. The external periphery of the outer pipe 52 has a plurality of extension pipes 63, each corresponding to the wavy inner pipe 43 of the water intake pipe 41, and an end of the extension pipe 63 is connected to the wavy inner pipe 43 of the water intake pipe 41, and another end of the extension pipe 63 is extended upward and connected to the inner pipe 53 that is installed to the power boat 10, and the extension pipe 63 is made of an elastic and contractible material, so that when the inner pipe 53 is moved up and down in the outer pipe 52, each extension pipe 63 is linked with the inner pipe 53. Similarly, the power boat 10 is connected to a plurality of stationary steel cables 61 and floating boxes 62 around the power boat 10 as shown in FIG. 1, and the bottom of the power boat 10 has a plurality of sinking caissons 14 for providing a gravitational force to reduce the effect of waves to the power boat 10 at the sea surface and improve the stability of the power boat 10 at the sea surface.

Figure 6:
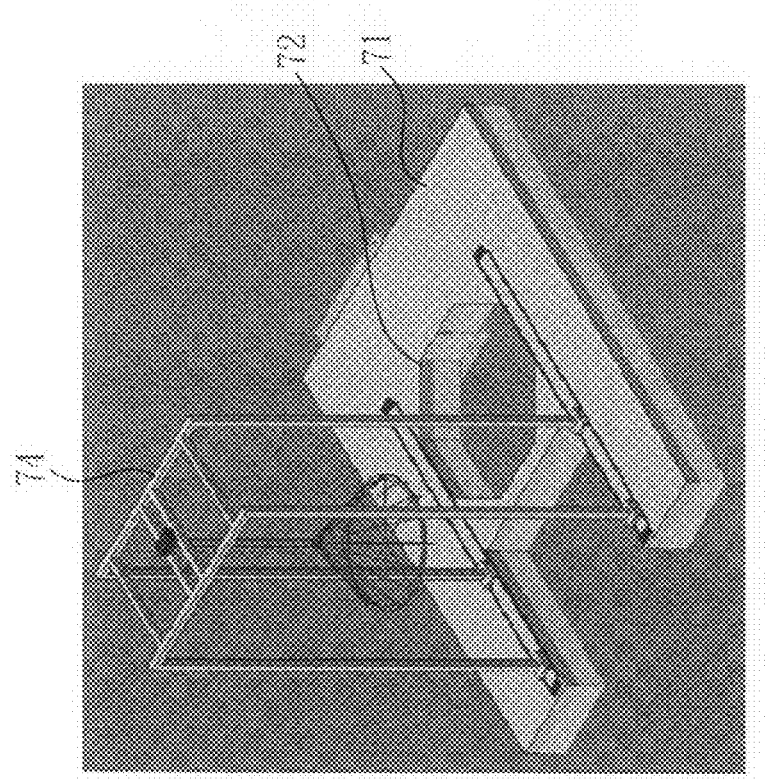

The installation of a submarine cold water pipe water intake system of an ocean thermal energy conversion power plant in accordance with the present invention comprises the following steps:

(a) Drive a gondola 71 to an installation site, wherein the gondola 71 has an installing area 72 interconnected to a sea surface and a crane frame 74 can be moved on the gondola 71 (as shown in FIG. 6).

Figure 7:
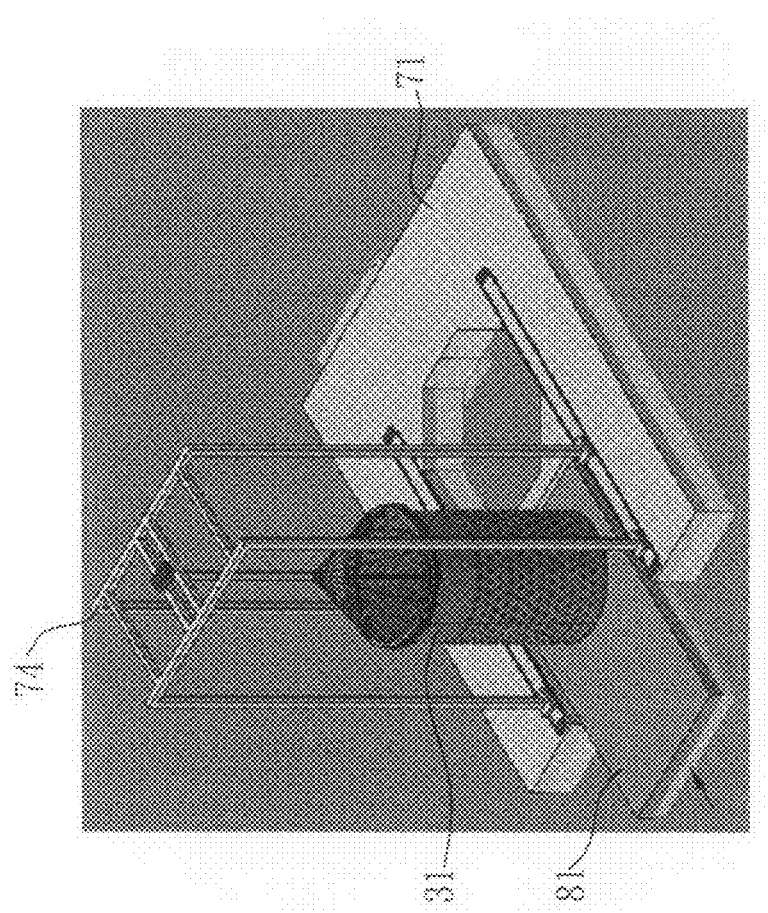
Figure 9:
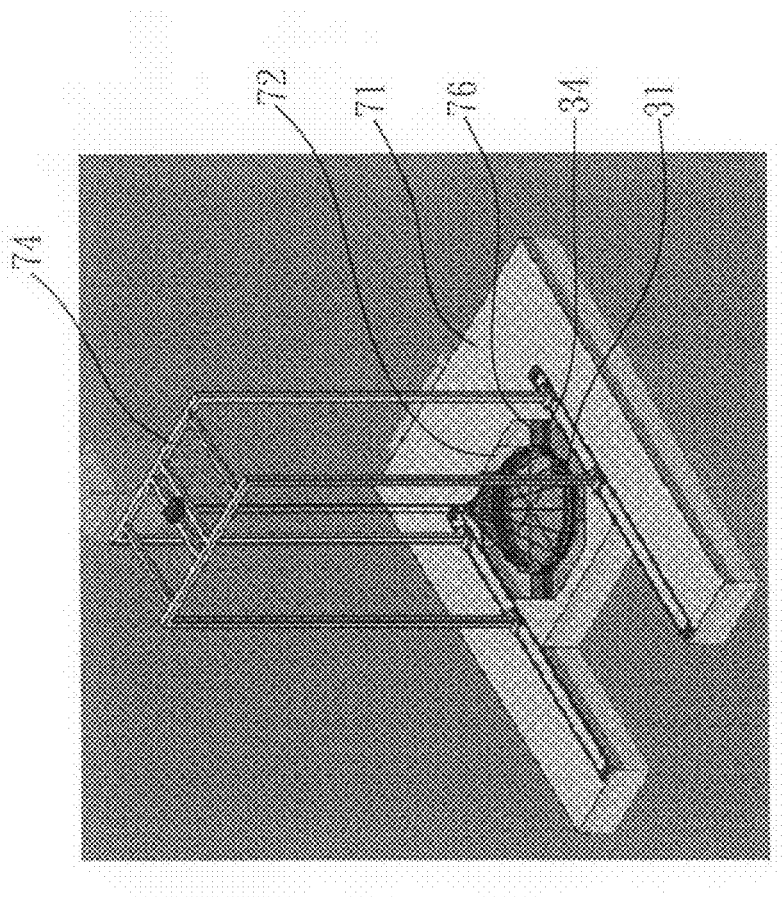
Figure 8:
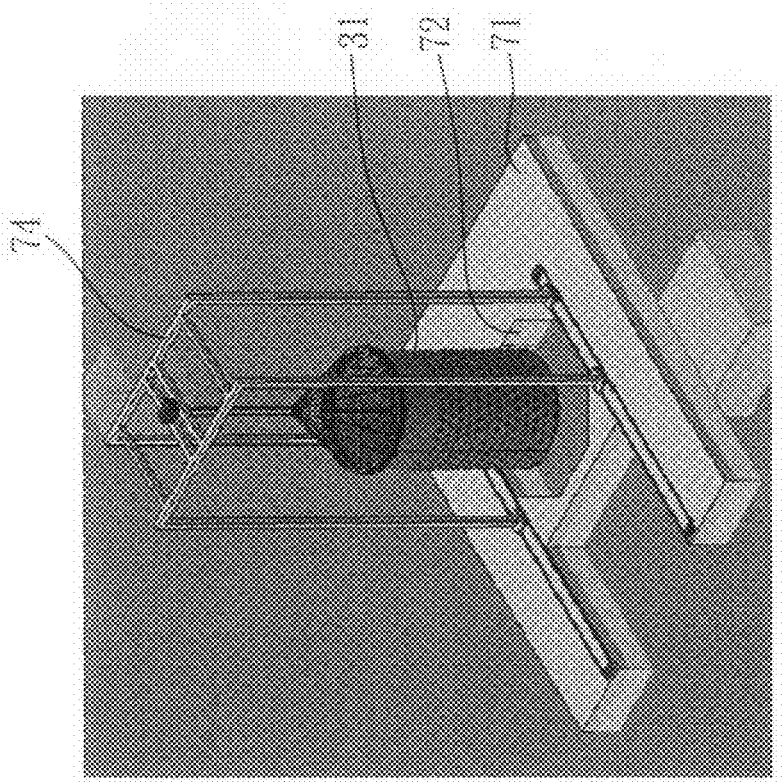

(b) Transport a water intake head 31 to a position adjacent to the gondola 71 by a carrier 81 (as shown in FIG. 7), and then use the crane frame 74 to hoist the water intake head 31 above the installing area 72 (as shown in FIG. 8). Lower the water intake head 31 from the installing area 72 into the seawater, and clamp a fixed arm 76 to a fixing portion 34 of the water intake head 31 (as shown in FIG. 9).

Figure 10:
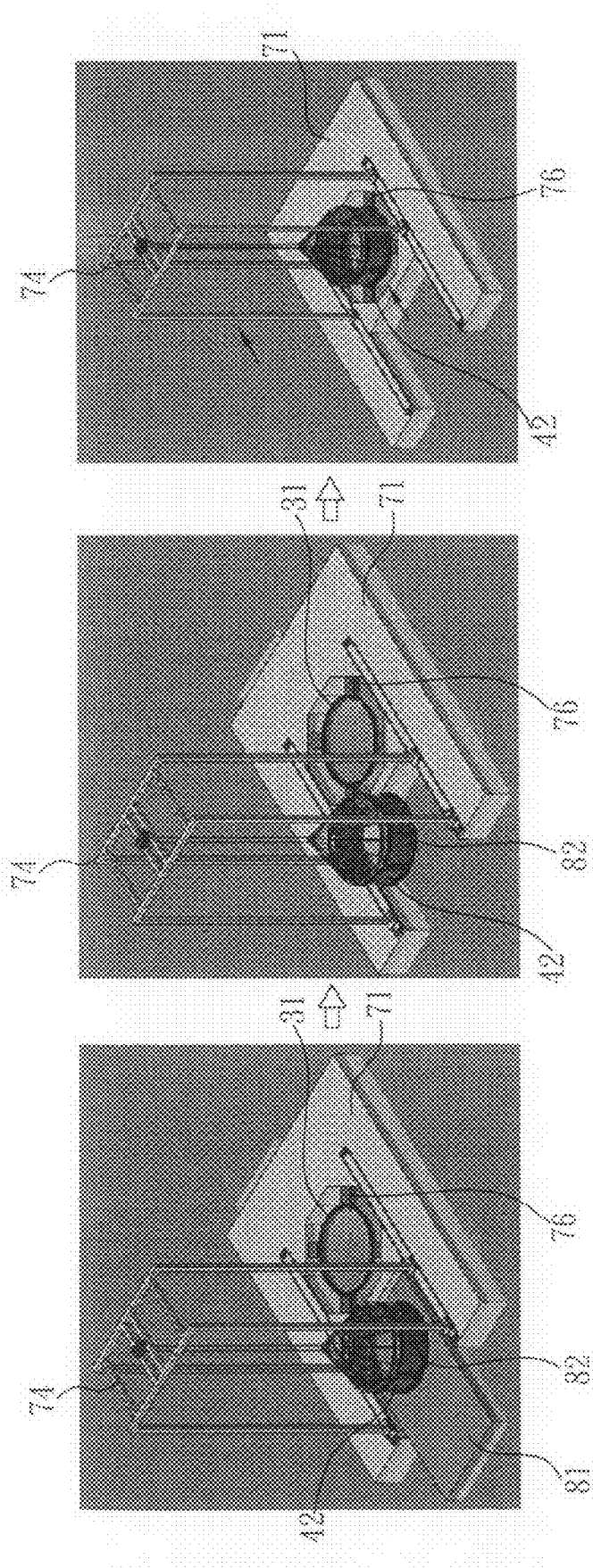

(c) Transport a composite pipe 42 compressed by a supporting steel frame 82 to a position adjacent to the gondola 71, and then use the crane frame 74 to hoist the composite pipe 42 above the position of a water intake head 31 of the installing area 72, and connect a connecting portion 45 at the bottom of the composite pipe 42 to a fixing portion 34 of the water intake head 31 (as shown in FIG. 10).

Figure 11:
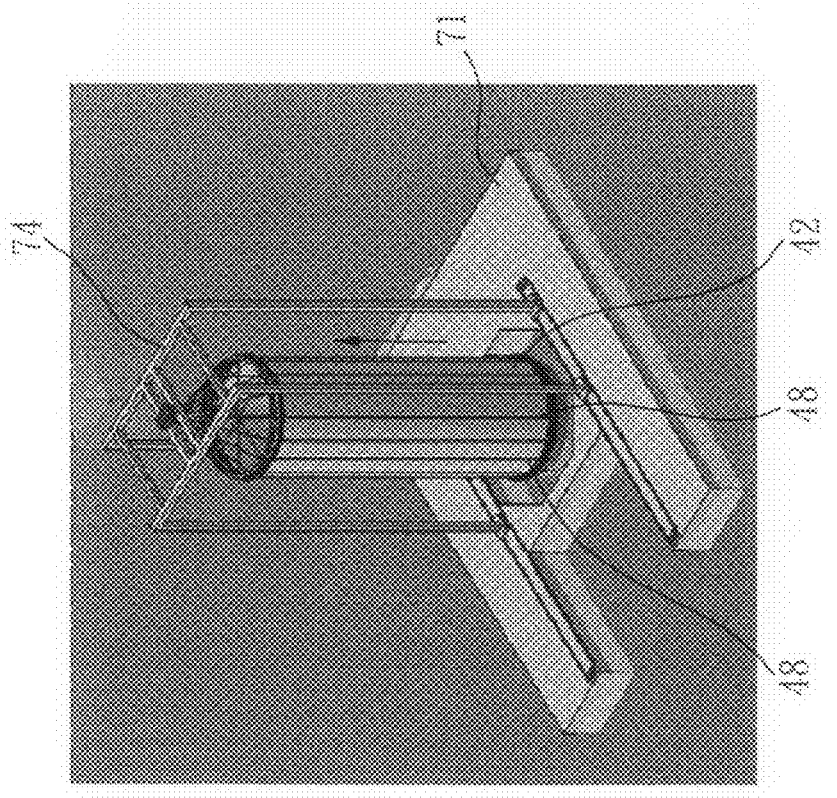

(d) Remove the supporting steel frame 82 of the compressed composite pipe 42, and use the crane frame 74 to hoist the composite pipe 42 and resume the original length of the composite pipe 42. Now, a plurality of steel ropes 48 wrapped by polyethylene resin are installed longitudinally along the external periphery of the composite pipe 42 (as shown in FIG. 11), and use a surge tank (not shown in the figure) to fill water into the wavy inner pipe 43 of the composite pipe 42, so as to reinforce the strength of the pipe wall of the composite pipe 42.

Figure 12:
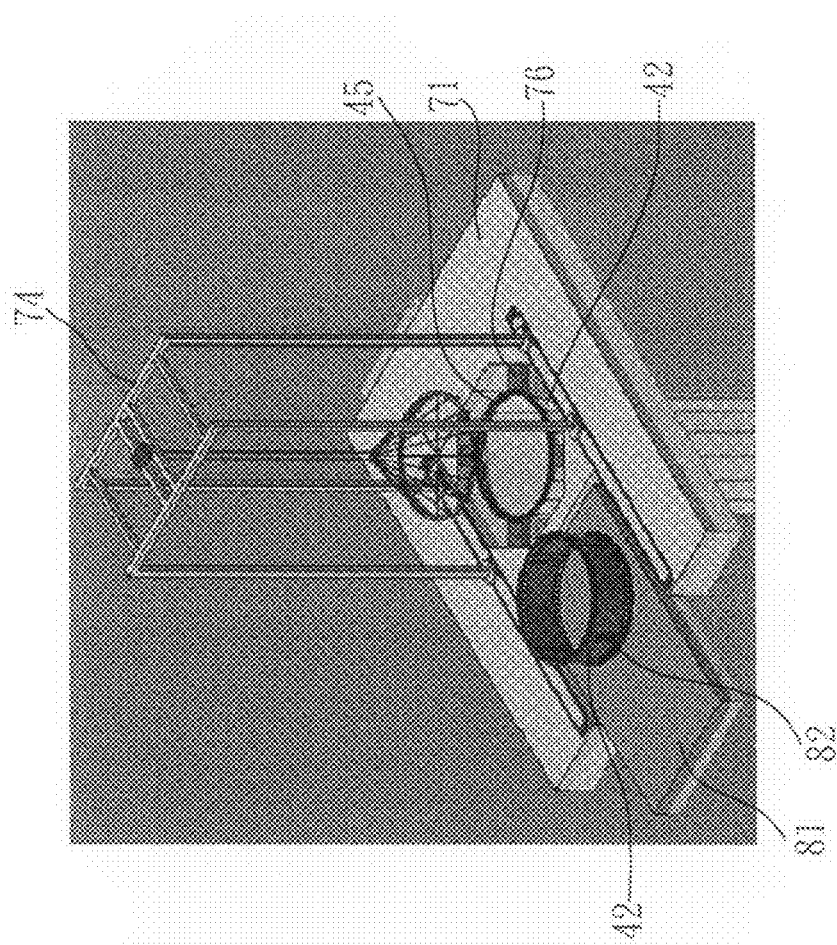

(e) Loosen the fixed arm 76 to sink the composite pipe 42 into the seawater, and clamp the fixed arm 76 to the composite pipe 42 at the top of the connecting portion 45, and then transport another composite pipe 42 to a position adjacent to the gondola 71 (as shown in FIG. 12).

(f) Repeat Steps (c) to (e) until the serially connected composite pipe 42 reaches a predetermined length.

Figure 14:
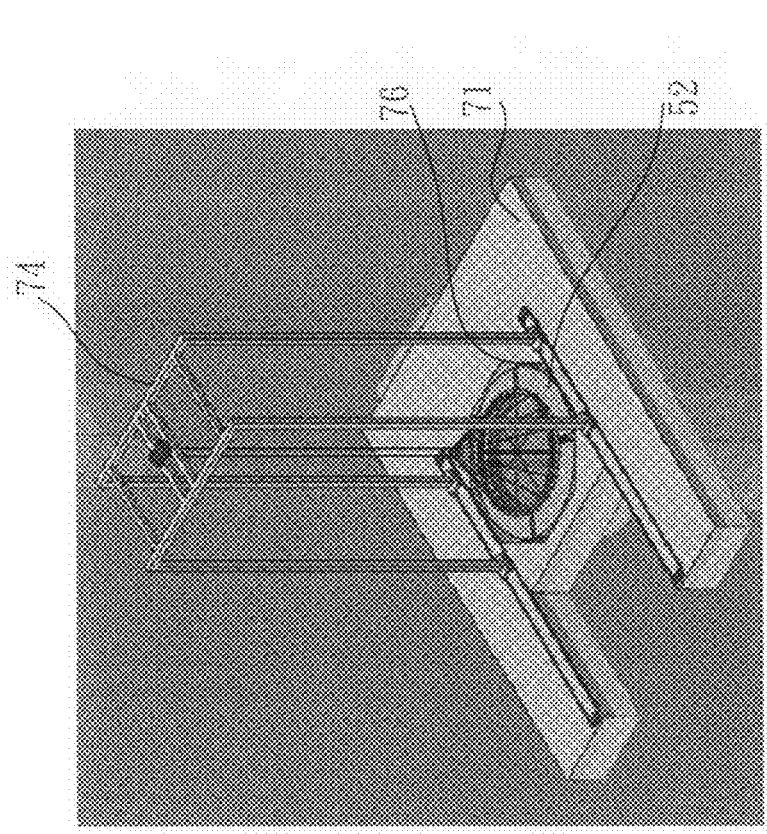
Figure 13:
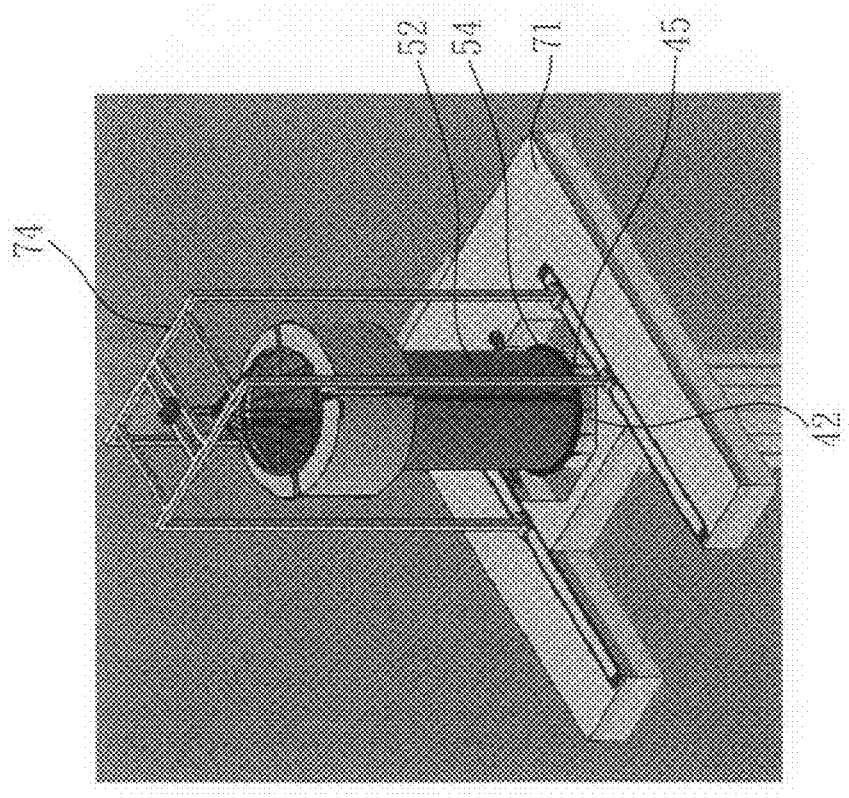

(g) Transport the outer pipe 52 to a position adjacent to the gondola 71, and use the crane frame 74 to hoist the outer pipe 52 above the composite pipe 42 (as shown in FIG. 13), and connect the engaging portion 54 of the outer pipe 52 to the connecting portion 45 of the composite pipe 42, and loosen the fixed arm 76 by lowering the outer pipe 52 to the seawater and clamp the fixed arm 76 to the upper end of the outer pipe 52 (as shown in FIG. 14).

Figure 16:
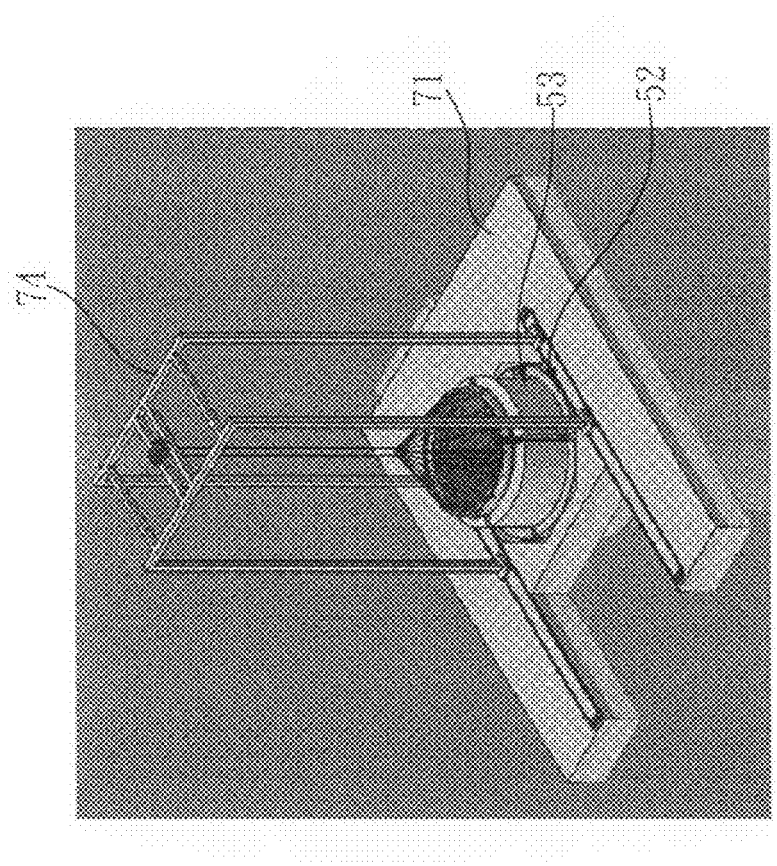
Figure 15:
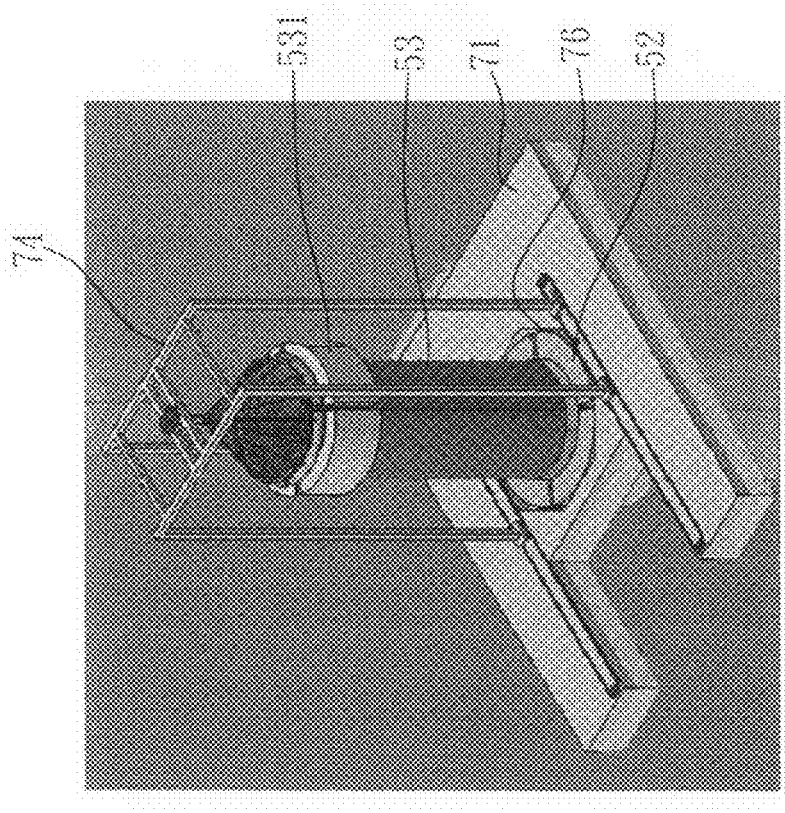

(h) Transport the inner pipe 53 to a position adjacent to the gondola 71, and use the crane frame 74 to hoist the inner pipe 53 above the outer pipe 52 (as shown in FIG. 15), and lower the inner pipe 53 to connect the outer pipe 52 (as shown in FIG. 16), so as to constitute the cold water pipe 21 of the present invention.

(i) Connect a plurality of stationary steel cables 61 to the outer pipe 52, wherein an end of each stationary steel cable 61 is connected to the outer pipe 52, and another end of each stationary steel cable 61 is sunk to the seabed, and the stationary steel cable 61 has a floating box 62 for pulling the stationary steel cable 61 appropriately and tightly by the buoyancy of the floating box 62. Add an appropriate amount of water into the buoy 531 of the inner pipe 53 to sink the inner pipe 53 to an appropriate position below the sea surface (as shown in FIG. 17).

(j) Drive the power boat 10 to a position above the cold water pipe 21, and align an open end of the cold water inlet 12 with an open end of the inner pipe 53 of the power boat 10. Withdraw an appropriate amount of water from the floating box 531 of the inner pipe 53 to float the inner pipe 53 slightly. Pump a predetermined weight of seawater into the power boat 10, such that the carrying weight of the power boat 10 will lower the position of the boat to engage the cold water inlet 12 of the power boat 10 with the inner pipe 53 of the cold water pipe 21 (as shown in FIG. 18).

Figure 19:
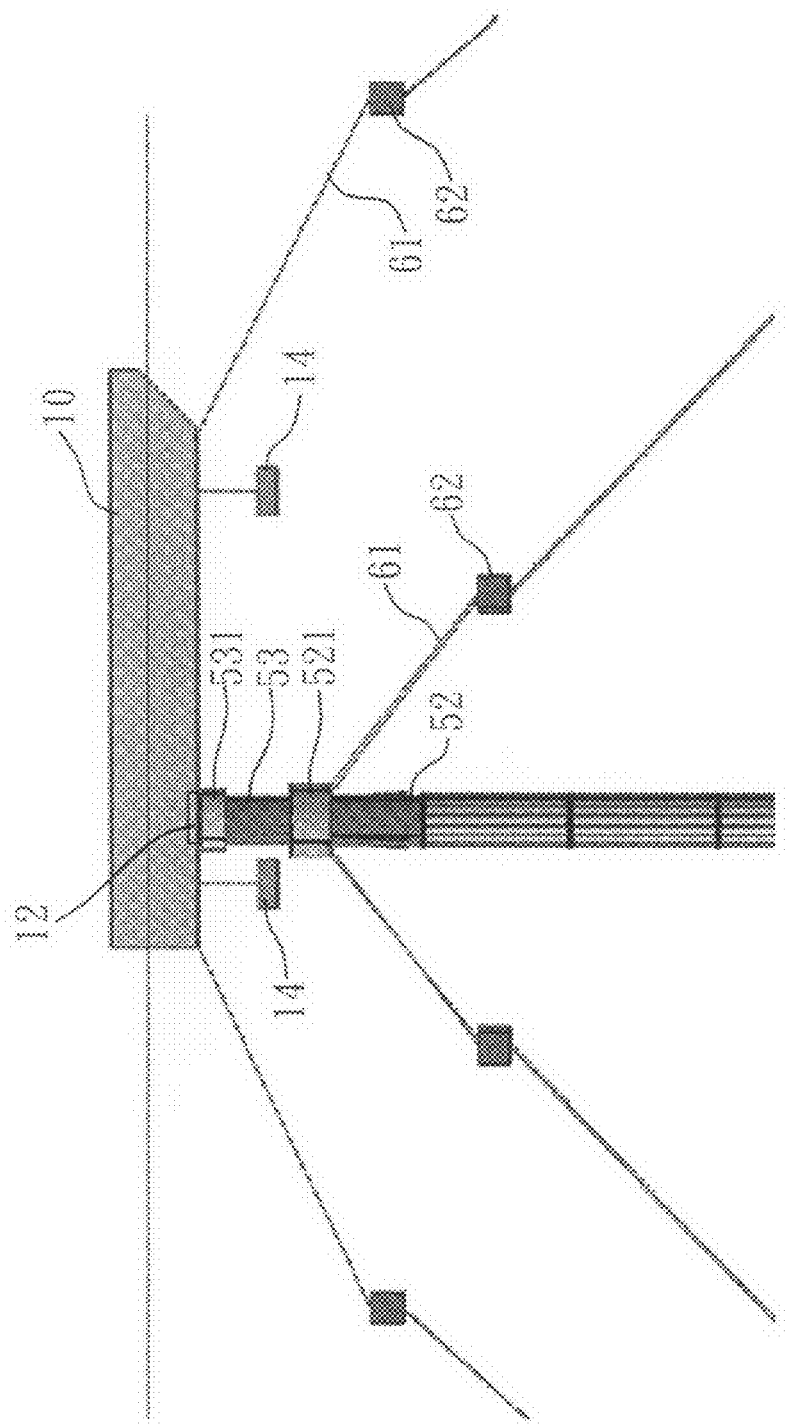
Figure 20:
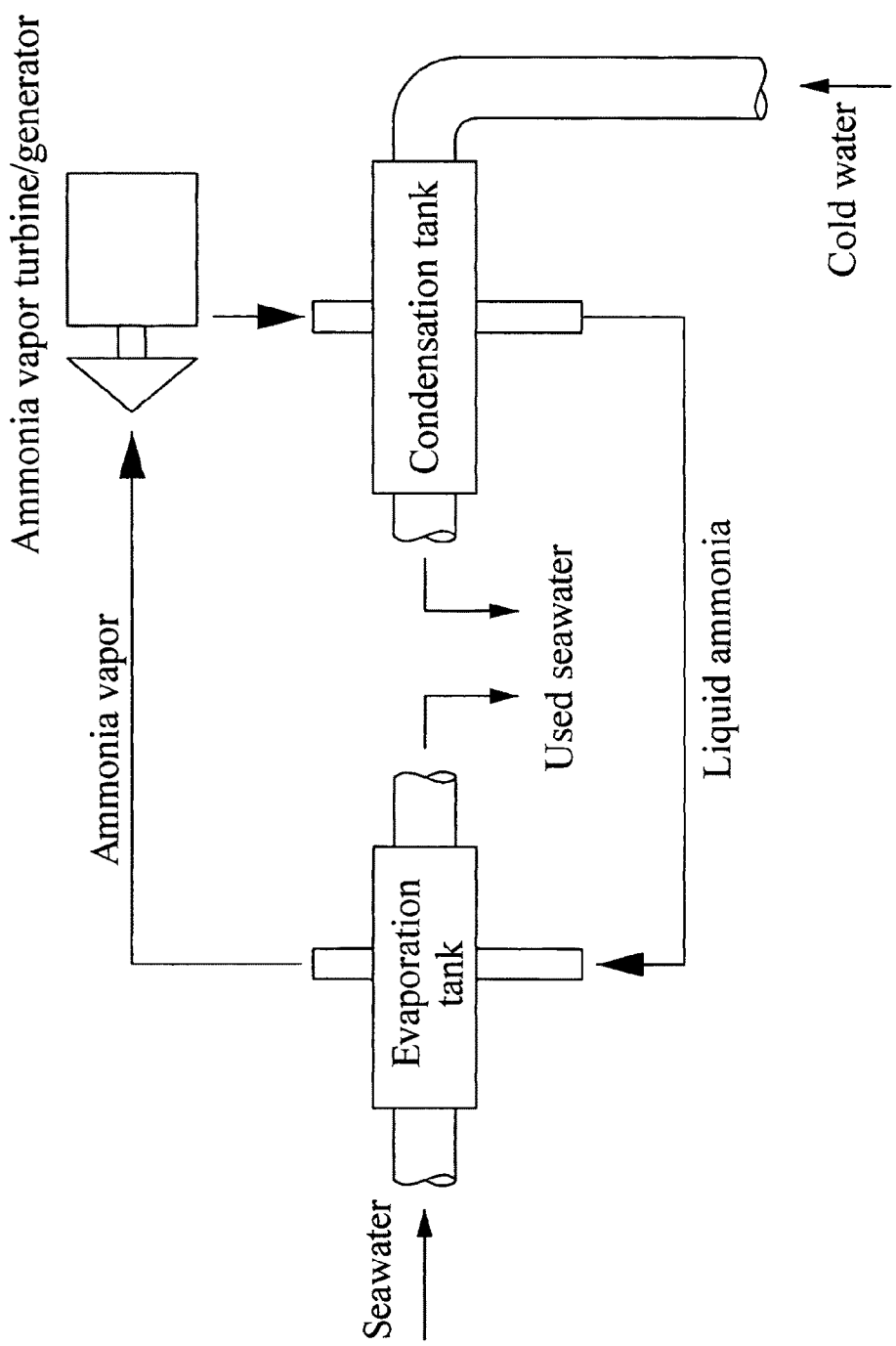
FIG. 20 is a flow chart of a principle of an ocean thermal energy conversion in accordance with the present invention.

(k) Connect a plurality of stationary steel cables 61 and floating boxes 62 around the periphery of the power boat 10. A plurality of sinking caissons 14 installed to the bottom of the power boat 10 can improve the stability of the power boat 10 at the sea surface (as shown in FIG. 19).

The submarine cold water pipe water intake system of an ocean thermal energy conversion power plant in accordance with the present invention has the following advantages:

1. The water intake pipe of the invention is formed by connecting a plurality of composite pipes in series, and each composite pipe is formed by arranging a plurality of flexible and bendable wavy inner pipes sequentially. Compared with the whole water intake pipe made of steel, the invention requires a simpler manufacturing process and a lower manufacturing price.
2. The composite pipe of the invention is formed by arranging a plurality of wavy inner pipes to form a pipe wall structure, and a surge tank is provided for filling water into the wavy inner pipe of the composite pipe to expand the pipe wall of the composite pipe and reinforce the structural strength of the composite pipe, wherein the pipe wall is substantially a wavy structure, and thus the invention can effectively resist the pressure exerted from different directions.
3. The composite pipe of the invention is formed by a plurality of flexible wavy inner pipes, and a powerful watertight fabric wrapped around internal and external peripheries of the pipe wall of the composite pipe, so that the composite pipe has the flexible and bendable properties, so that the volume can be compressed effectively for the transportation. Further, the water intake pipe is formed by connecting the composite pipes in series below sea surface for effectively avoiding a direct attack of currents of the seawater by the flexible pipe wall.
4. The invention connects the inner pipe to the cold water inlet of the power boat. The inner pipe can be extended and retracted in the outer pipe, so that after the power boat is connected to the inner pipe to improve the draught of the power boat at sea surface, so that the power boat carry out the electric power generation at the sea surface more stably. The water intake pipe and the power boat have a plurality of stationary steel cables, and a plurality of sinking caissons installed under the power boat for effectively enhancing the stability of the water intake pipe below sea surface and the power boat at sea surface.
5. The connecting pipe of the invention is formed by connecting the outer pipe and the inner pipe, and the external peripheries of the outer pipe and the inner pipe have a plurality of buoys, so that when the inner pipe flows at sea level, the inner pipe is sheathed into the outer pipe, the inner pipe can be extended or retracted along the outer pipe to prevent the vertically up and down shaking effects of the waves on the inner pipe since the outer pipe is connected to the water intake pipe and may be dragged by the inner pipe

What is claimed is:

1. A submarine cold water pipe water intake system of an ocean thermal energy conversion power plant, having a cold water inlet disposed on a power boat, a water pump device installed at the cold water inlet, a cold water pipe with an end coupled to the cold water inlet of the power boat, and another end extended into a seabed for sucking low-temperature seawater, and the cold water pipe comprising:

a water intake head, having a plurality of filter holes disposed on a surface of the water intake head, and a fixing portion disposed at an end of the water intake head;

a water intake pipe, with an end coupled to the fixing portion of the water intake head, and the water intake pipe being formed by connecting a plurality of composite pipes in series, wherein each composite pipe includes a plurality of wavy inner pipes arranged sequentially into a tubular shape, and a watertight fabric wrapped around internal and external peripheries of a pipe wall of the composite pipe, and each of both ends of the composite pipe includes a connecting portion, and a plurality of connecting through holes disposed on the connecting portion and corresponding to each wavy inner pipe;

a connecting pipe, formed by sheathing an outer pipe with an inner pipe, for connecting an inner pipe of the connecting pipe to a water inlet of the power boat, and an end of the outer pipe of the connecting pipe having an engaging portion connected to a connecting portion of the water intake pipe, and one or more buoys installed on each of the outer pipe and the inner pipe.

2. The submarine cold water pipe water intake system of an ocean thermal energy conversion power plant as recited in claim 1, further comprising a plurality of fixing holes disposed around a distal surface of the connecting portion, and each composite pipe being coupled by to the fixing hole of the connecting portion, and a plurality of locking elements being passed through the fixing hole of each connecting portion for integrating each composite pipe.

3. The submarine cold water pipe water intake system of an ocean thermal energy conversion power plant as recited in claim 1, wherein each connecting through hole is extended outward from the connecting portion, and connected with each wavy inner pipe in series in the composite pipe.

4. The submarine cold water pipe water intake system of an ocean thermal energy conversion power plant as recited in claim 1, wherein further comprising a plurality of positioning holes disposed around a wall surface of the connecting portion, and the composite pipe is secured into the composite pipe and each positioning hole on a wall surface of the connecting portion by a positioning element.

5. The submarine cold water pipe water intake system of an ocean thermal energy conversion power plant as recited in claim 1, further comprising plurality of steel ropes wrapped with polyethylene resin and connected between the connecting portions at both upper and lower ends of the composite pipe for supporting and propping both ends of the composite pipe.

6. The submarine cold water pipe water intake system of an ocean thermal energy conversion power plant as recited in claim 1, wherein the composite pipe uses a surge tank for filling water with an appropriate water pressure into a wavy inner pipe of the composite pipe for its use, such that the pipe wall of the composite pipe is expanded and the structural strength of the composite pipe is reinforced.

7. The submarine cold water pipe water intake system of an ocean thermal energy conversion power plant as recited in claim 1, wherein the buoy of the outer pipe provides a buoyancy greater than the total weight of the water intake head, the water intake pipe and the outer pipe, such that the buoyancy of the buoy of the inner pipe can be adjusted to extend or retract the inner pipe in the outer pipe.

8. The submarine cold water pipe water intake system of an ocean thermal energy conversion power plant as recited in claim 1, further comprising a plurality of fixed pulleys installed at an external periphery the outer pipe, and an end of a stationary steel cable being wound around the fixed pulley of the outer pipe, and a steel cable fixing clamp being used for fixing the stationary steel cable wound around the fixed pulley, and another end of the stationary steel cable being sunk to a seabed, and the stationary steel cable having a floating box, such that the stationary steel cable is pulled by the buoyancy of the floating box to produce a horizontal force.

9. The submarine cold water pipe water intake system of an ocean thermal energy conversion power plant as recited in claim 1, further comprising a plurality of stationary steel cables and floating boxes connected to the periphery of the power boat, and an end of the stationary steel cable being connected to the power boat, and another end of the stationary steel cable being sunk to a seabed, and each fixed steel rope having the floating box.

10. The submarine cold water pipe water intake system of an ocean thermal energy conversion power plant as recited in claim 9, further comprising a plurality of sinking caissons installed at the bottom of the power boat for providing a gravitational force.

11. The submarine cold water pipe water intake system of an ocean thermal energy conversion power plant as recited in claim 1, wherein further comprising a plurality of extension pipes disposed around the external periphery of the outer pipe, and each extension pipe corresponds to the wavy inner pipe in the water intake pipe, and an end of the extension pipe is connected to a wavy inner pipe of the water intake pipe, and another end of the extension pipe is extended upward to the inner pipe can connected to the power boat.

* * * * *